ured Mar. 20, 1962

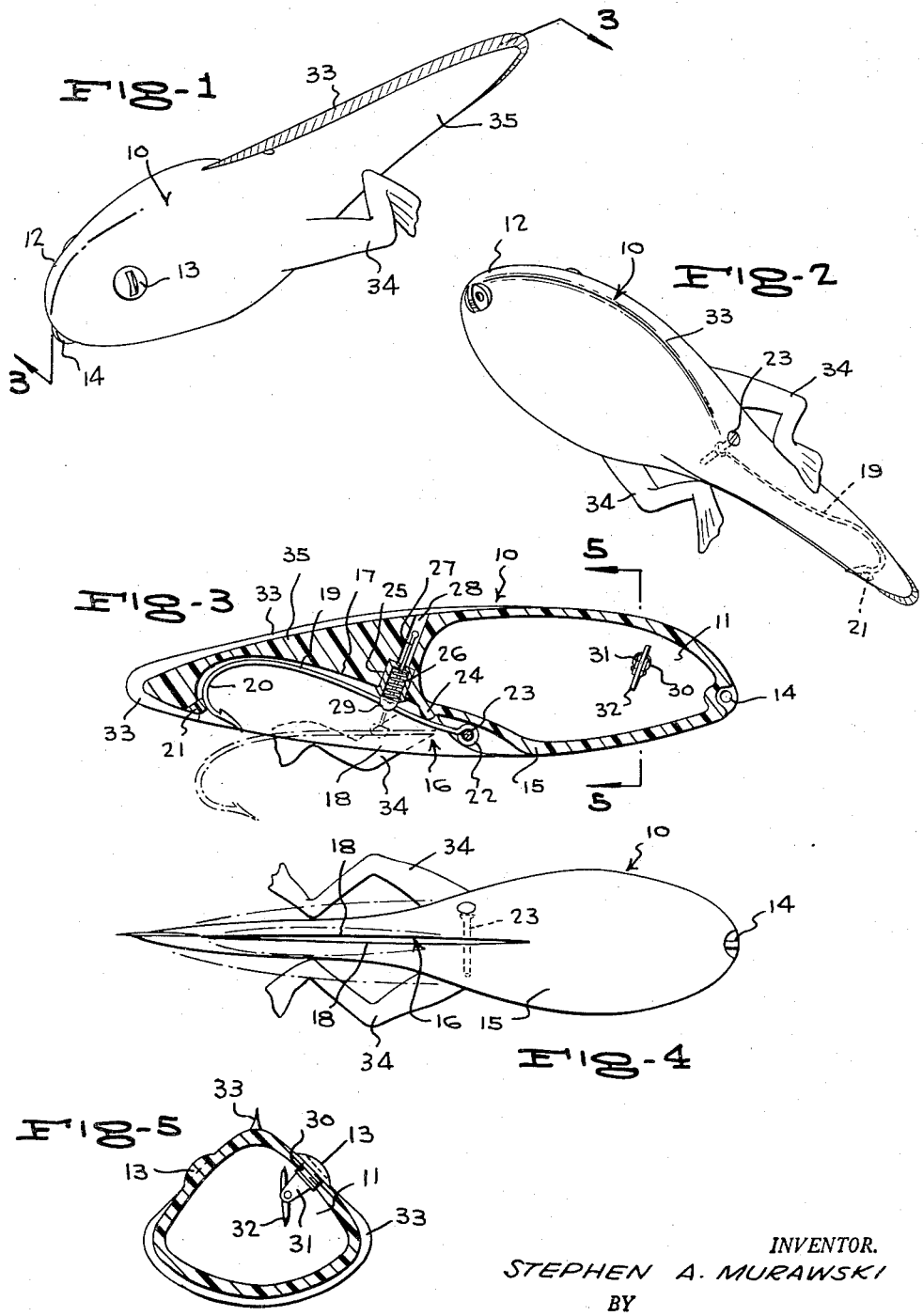

3,025,628
ARTIFICIAL CASTING BAIT
Stephen A. Murawski, 13422 Ave. K, Chicago, Ill.
Filed Mar. 31, 1959, Ser. No. 803,273
1 Claim. (Cl. 43—35)

This invention relates to an artificial casting bait.

It is an important object of the invention to provide an artificial casting bait wherein the body of the bait is constructed from soft pliable plastic materials, in any desired shape, such as a minnow, frog, tadpole or the like, and wherein the forward portion of the bait is provided with a hollow interior into which water may be readily added or removed, to vary the weight of the bait for use in deep or shallow water fishing and wherein the rear portion of the bait is provided with an elongated open chamber for concealing a spring tensioned hook which is readily releasable upon compressive force exerted upon and around said open chamber to collapse the body portion forming the same, which force would occur upon receiving a strike from a fish.

More specifically, it is an object of the invention to provide a casting bait wherein the body thereof is formed from a soft pliable plastic material, the outer surface of which is provided with thin flexible extensions which may represent the fins of a minnow or the like, which under motion of the bait through the water will have a fluttering or moving motion to induce a fish to strike the bait; the forward portion of the bait body being hollow for storage of water to vary the weight of the bait to meet varying fishing requirements; the forward portion further including the representation of the eyes of a live minnow, one of the eyes being removable for increasing or decreasing the water volume within the hollow portion thereof, the eye including a stem portion having a means within the body for limiting the complete removal of the eye from the body, and the rear portion of the body being formed with an elongated passage for housing a spring tensioned hook held in set position within the passage due to engagement with an abutment within the passage, the hook being released from the abutment upon collapse of the material defining the passage.

Additional objects, advantages and features of invention will be apparent from the following description, considered in conjunction with the accompanying drawing, wherein, FIGURE 1 is a perspective view of the bait constructed in accordance with the invention.

FIGURE 2 is a similar view of the bait as seen from the rear thereof.

FIGURE 3 is a longitudinal section taken on the 3—3 of FIGURE 1.

FIGURE 4 is a bottom plan view of the bait, and

FIGURE 5 is a cross section on the line 5—5 of FIGURE 2.

There is illustrated a casting bait, generally indicated by the reference character 10, which in the present instance is shown in the form of a tadpole, although such form is not arbitrary since the essential features of the invention may be incorporated in any desired lure or bait formation.

The bait 10 is molded or otherwise formed from soft plastic materials, suitably colored to represent the coloring of the specimen it is desired to emulate. The body of the bait is formed with a hollow chamber 11 in the forward or head end 12 thereof and will embody respective eyes 13, one of which is releasable to permit access to the chamber 11 to vary the weight of the bait by the addition or reduction of the volume of water within the chamber, as will be described.

The nose or foremost portion of the bait is formed with an eyelet 14 for reception of a fishing line (not shown) and is preferably partially concealed so as not to distract from the appearance of a live specimen.

The lower or belly portion 15 of the bait is formed with a passage 16 defined by an upper wall 17 and side walls 18, the upper wall 17 having a curvature corresponding to the contour of the fish hook 19 including the bight portion 20 thereof, the wall terminating in a projecting abutment 21 for releasably retaining the hook, as will be explained hereinafter. The shank of the hook 19 has an eyelet 22 for receiving a transversely positioned pin 23 for pivotally mounting of the hook.

Rearwardly of the pin 23, the wall 17 is formed with a projecting abutment 24 against which a portion of the shank of the hook will contact for tensioning the same, and beyond the abutment, an open-ended sleeve 25 is suitably molded or otherwise secured. The sleeve houses a helical spring 26 and a rod 27, the upper end of the rod being slidable in a bore 28 formed in the bait body, while the opposite end of the rod has a slotted shoe 29 adapted to engage the shank of the hook. Thus, the spring 26 will tension the hook urging the latter from the passage 16, but is retained in the passage by means of the abutment 21.

The removable eye 13 is formed with a screw threaded shank 30 for engagement with a threaded bore formed in the bait head 12 and further includes an extension 31 for pivotal mounting of an arm 32, which arm will assume a position with respect to the threaded bore preventing complete removal of the eye, thus preventing loss or misplacement thereof.

To further increase the life-like appearance of the bait, thin flexible appendages 33 in the form of fin-like members or legs 34 are provided, which under motion through the water will partake of shimmering movements.

In use, the fishing line (not shown) is secured in the eyelet 14 to effect movement of the bait through the water, the hook 19 being in the position shown in solid lines in FIGURE 2, where it is retained free from entanglement with foreign matter such as weeds. In this position, it will be noted that the bight portion of the hook contacts the abutment 21, the spring 26 being under compression to urge the hook into the dotted line position which would be effected upon collapse of the tail portion 35 at the time that the bait is struck by a fish.

When it is desired to add or remove water from the compartment 11, the removable eye 13 may be unscrewed, the arm 32 preventing complete removal of the shank 31 from the threaded aperture in the head.

While I have shown and described a preferred form of the bait, this is by way of illustration only, and I consider as my own all such changes in construction as fairly fall within the scope of the appended claim.

I claim:

An artificial casting bait comprising a body member formed from soft, pliable material having a forward hollow compartment and a rearwardly disposed elongated open chamber in the underside thereof, a hook member housed within said open chamber, the shank of the hook being pivotally mounted intermediate the length of the body member, spring means within the body member and engaging the shank of the hook rearwardly of the pivot point of said hook to forcibly project the hook from the open chamber, the inner wall of said elongated open chamber being formed with an abutment positioned between the point of pivotal movement of the shank of the hook and the point of contact of the spring means with the shank and an abutment at the rear portion of the open chamber to retain the hook in set position against the tension of said spring means.

(References on following page)

References Cited in the file of this patent

UNITED STATES PATENTS

| | | |
|---|---|---|
| 1,786,568 | Kutz | Dec. 30, 1930 |
| 1,808,565 | McLaughlin | June 2, 1931 |
| 1,890,266 | Schadell et al. | Dec. 6, 1932 |
| 2,149,054 | Jones | Feb. 28, 1939 |
| 2,381,279 | Haberkorn | Aug. 7, 1945 |
| 2,424,096 | Janchan | July 15, 1947 |
| 2,567,310 | Anderson | Sept. 11, 1951 |
| 2,568,547 | Hoffman | Sept. 18, 1951 |
| 2,651,877 | Olson | Sept. 15, 1953 |
| 2,749,647 | Beloff | June 12, 1956 |

FOREIGN PATENTS

| | | |
|---|---|---|
| 1,021,228 | France | Feb. 16, 1953 |